June 23, 1964          P. L. RUBEN          3,138,651

OPTICAL SYSTEM FOR MICROSCOPE OBJECTIVE

Filed March 9, 1962

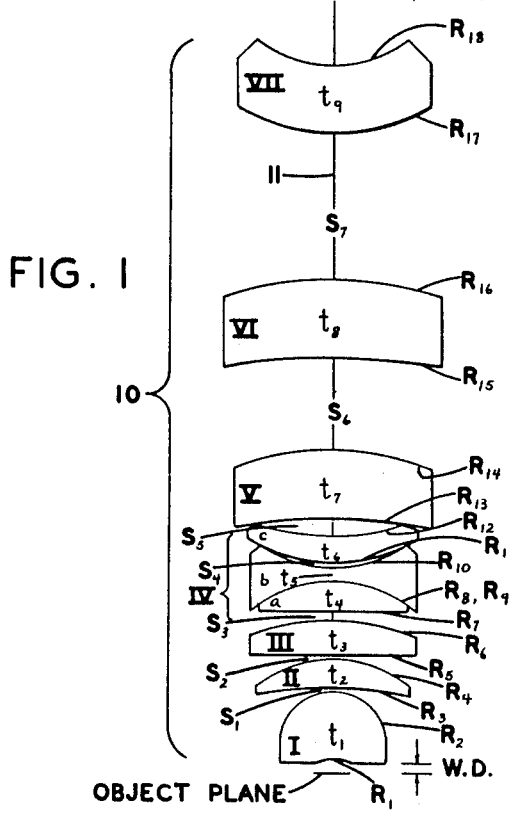

FIG. 1

| E.F. = 4.19 | | MAGNIFICATION = 50X | | N.A. = 0.85 | |
|---|---|---|---|---|---|
| LENS | RADII | THICKNESS | SPACES | $n_D$ | $\nu$ |
| I | $R_1 = -1.9055$<br>$R_2 = -2.8576$ | $t_1 = 3.39$ | $S_1 = .10$ | 1.620 | 60.3 |
| II | $R_3 = -24.210$<br>$R_4 = -5.445$ | $t_2 = 1.60$ | $S_2 = .10$ | 1.620 | 60.3 |
| III | $R_5 = \infty$<br>$R_6 = -10.186$ | $t_3 = 1.80$ | $S_3 = .10$ | 1.611 | 58.8 |
| IV | a $\{R_7 = \infty$<br>$\{R_8 = -7.0469$ | $t_4 = 1.40$ | $S_4 = .06$ | 1.620 | 60.3 |
|  | b $\{R_9 = -7.0469$<br>$\{R_{10} = 7.0469$ | $t_5 = .70$ |  | 1.751 | 27.8 |
|  | c $\{R_{11} = 7.4473$<br>$\{R_{12} = 100.00$ | $t_6 = 1.80$ | $S_5 = .44$ | 1.517 | 64.5 |
| V | $R_{13} = -22.909$<br>$R_{14} = -13.183$ | $t_7 = 3.60$ | $S_6 = 4.70$ | 1.617 | 54.9 |
| VI | $R_{15} = -36.983$<br>$R_{16} = -18.030$ | $t_8 = 3.90$ |  | 1.720 | 36.2 |
| VII | $R_{17} = 7.5858$<br>$R_{18} = 5.5463$ | $t_9 = 3.67$ | $S_7 = 9.00$ | 1.617 | 54.9 |

FIG. 2

INVENTOR.
PAUL L. RUBEN
BY Frank C. Parker
ATTORNEY

United States Patent Office 3,138,651
Patented June 23, 1964

3,138,651
OPTICAL SYSTEM FOR MICROSCOPE OBJECTIVE

Paul L. Ruben, Rochester, N.Y., assignor to Bausch & Lomb Incorporated, Rochester, N.Y., a corporation of New York
Filed Mar. 9, 1962, Ser. No. 178,623
5 Claims. (Cl. 88—57)

This invention relates to a microscope objective of medium power and more particularly it relates to improvements in the optical system therefor.

It is an object of this invention to provide an improved optical system for a microscope objective of medium power, said objective having a substantially diffraction-limited performance over its entire field which is substantially flat.

It is a further object to provide a high-grade microscope objective which transmits a minimum of 70% of the reflected meridional ray fan and has a numerical aperture of at least 0.85 but nevertheless incorporates economical features of construction therein.

Further objects and advantages will be found in the details of construction and combination of parts, reference being had to the specification herebelow for a description thereof in connection with the accompanying drawing, wherein:

FIG. 1 shows an optical diagram of an objective constructed according to the present invention; and FIG. 2 shows a chart of the constructional data for said objective.

The objective which is described in the specification herebelow is particularly designed for use in metallurgical microscopes and the like, so as to provide a medium rated magnification of the order of 50× and a numerical aperture of substantially 0.85. An improved optical system for said objective is generally designated by the numeral 10 in the drawing and comprises two front meniscus singlet lenses numbered I, II and a singlet collective lens numbered III located in spaced relation and optical alignment to each other and having their steepest curved surfaces on the side toward the image.

Spaced rearwardly from lens III is a triplet lens member IV comprising a plano-convex lens element IVa which is in contact with or cemented to a double concave lens element IVb, and further comprising a meniscus lens element IVc which is convex toward and preferably in edge contact with the double concave element IVb. A pair of axially separated singlet meniscus lens members V and VI are spaced rearwardly from said triplet member IV, said singlets being concave toward the object side. Most rearwardly a meniscus singlet lens member VII is spaced away from lens member VI, member VII being concave toward the image side of the optical system. All of the above-mentioned members are optically aligned on an axis 11 and are so constructed as to produce a flat field, and have a diffraction-limited image over the entire field of substantially 20 mm. in the back focal plane. The objective is further designed to transmit a minimum of 70% of the reflected meridional ray fan at the edge of the field, and additionally the secondary color corrections and working distance of at least 0.105F are as good or better than comparable objectives of this type and magnification rating.

In the optical system 10, it has been found most favorable for the attainment of the objects of this invention to establish the values of focal lengths $F_I$ to $F_{VII}$ for the aforementioned lens members I to VII preferably as given in the table herebelow, said values being given in terms of F which represents the E.F. or equivalent focus of the optical system.

$F_I = 6.08F$       $F_V = 10.5F$
$F_{II} = 2.62F$    $F_{VI} = 10.7F$
$F_{III} = 3.97F$   $F_{VII} = -25.4F$
$F_{IV} = -3.91F$

In the aforesaid triplet lens member IV, the respective focal lengths $F_{IVa}$, to $F_{IVc}$ of the successive lens elements a, b and c should preferably be $$F_{IVa} = 2.71F$$
$$F_{IVb} = -1.09F$$
$$F_{IVc} = 3.69F$$

and the concave refractive surfaces of lens element IVb should preferably be equal for reasons of economy in manufacture. For the same reason, the lens surfaces $R_7$ as well as $R_5$ should be of plano form.

Contributory toward the achievement of the objects of this invention, the constructional data for the lens system 10 should have values lying within the ranges stated in the table herebelow wherein $R_1$ to $R_{18}$ denote the radii of the successive lens surfaces numbering from the object side of the optical system and the minus (—) sign used with certain R values denoting surfaces which are concave toward the object side, $t_1$ to $t_9$ designate the axial lens thicknesses thereof, $S_1$ to $S_7$ designate the spaces between the lenses, and $n_D$ and $\nu$ designate respectively the refractive index and Abbe number of the lens materials.

$$.43F < -R_1 < .47F$$
$$.65F < -R_2 < .71F$$
$$5.43F < -R_3 < 6.03F$$
$$1.23F < -R_4 < 1.35F$$
$$\pm R_5 > 10.0F$$
$$2.33F < -R_6 < 2.53F$$
$$\pm R_7 > 10.0F$$
$$1.59F < -R_8 < 1.75F$$
$$1.59F < -R_9 < 1.75F$$
$$1.59F < R_{10} < 1.75F$$
$$1.69F < R_{11} < 1.86F$$
$$22.8F < +R_{12} < 24.8F$$
$$5.26F < -R_{13} < 5.66F$$
$$3.0F < -R_{14} < 3.3F$$
$$8.4F < -R_{15} < 9.2F$$
$$4.11F < -R_{16} < 4.51F$$
$$1.72F < R_{17} < 1.90F$$

$1.26F < R_{18} < 1.38F$
$.73F < t_1 < .88F$
$.34F < t_2 < .42F$
$.38F < t_3 < .47F$
$.30F < t_4 < .37F$
$.15F < t_5 < .18F$
$.38F < t_6 < .47F$
$.77F < t_7 < .94F$
$.85F < t_8 < 1.03F$
$.77F < t_9 < .94F$ wherein + sign designates those lens surfaces which are convex toward the front, $.0235F < S_1 < .0287F$
$.0235F < S_2 < .0287F$
$.0235F < S_3 < .0287F$
$.0129F < S_4 < .0157F$
$.086F < S_5 < .105F$
$1.00F < S_6 < 1.23F$
$1.93F < S_7 < 2.35F$
$1.167 < n_D(I) < 1.622$
$1.617 < n_D(II) < 1.622$
$1.608 < n_D(III) < 1.613$
$1.617 < n_D(IVa) < 1.622$
$1.745 < n_D(IVb) < 1.755$
$1.512 < n_D(IVc) < 1.522$
$1.615 < n_D(V) < 1.620$
$1.715 < n_D(VI) < 1.725$
$1.615 < n_D(VII) < 1.620$
$54.0 < \nu(I) < 65.0$
$54.0 < \nu(II) < 65.0$
$53.0 < \nu(III) < 62.0$
$54.0 < \nu(IVa) < 65.0$
$25.0 < \nu(IVb) < 30.0$
$62.0 < \nu(IVc) < 66.0$
$52.0 < \nu(V) < 61.0$
$34.0 < \nu(VI) < 38.0$
$52.0 < \nu(VII) < 61.0$ One successful form of this invention has been found by computation and experimentation which is described in the table of equations as follows, the designations being the same as described heretofore.

| | |
|---|---|
| $R_1 = -.455F$ | $t_1 = .808F$ |
| $R_2 = -.686F$ | $t_2 = .381F$ |
| $R_3 = -5.76F$ | $t_3 = .429F$ |
| $R_4 = -1.3F$ | $t_4 = .334F$ |
| $R_5 = \infty$ | $t_5 = .167F$ |
| $R_6 = -2.43F$ | $t_6 = .429F$ |
| $R_7 = \infty$ | $t_7 = .86F$ |
| $R_8 = -1.68F$ | $t_8 = .93F$ |
| $R_9 = -1.68F$ | $t_9 = .825F$ |
| $R_{10} = 1.68F$ | $S_1 = .0239F$ |
| $R_{11} = 1.77F$ | $S_2 = .0239F$ |
| $R_{12} = 23.85F$ | $S_3 = .0239F$ |
| $R_{13} = -5.47F$ | $S_4 = .0143F$ |
| $R_{14} = -3.14F$ | $S_5 = .1048F$ |
| $R_{15} = -8.85F$ | $S_6 = 1.12F$ |
| $R_{16} = -4.29F$ | $S_7 = 2.14F$ |
| $R_{17} = 1.81F$ | |
| $R_{18} = 1.32F$ | |

$n_D(I) = 1.620$, $n_D(II) = 1.620$, $n_D(IVa) = 1.620$ and $\nu = 60.3$
$n_D(III) = 1.611$ and $\nu = 58.8$
$n_D(IVb) = 1.751$ and $\nu = 27.8$
$n_D(IVc) = 1.517$ and $\nu = 64.5$
$n_D(V) = n_D(VII) = 1.617$ and $\nu = 54.9$
$n_D(VI) = 1.720$ and $\nu = 36.2$ Specifically, the preferred form of the present invention is numerically given in the chart as appearing in FIG. 2 of the drawing and as repeated herebelow, the designations therein being the same as those mentioned heretofore.

[E.F.=4.19.  Magnification=50X.  N.A.=0.85]

| Lens | Radii | Thickness | Spaces | $n_D$ | $\nu$ |
|---|---|---|---|---|---|
| I | $R_1 = -1.9055$ | $t_1 = 3.39$ | | 1.620 | 60.3 |
| | $R_2 = -2.8576$ | | $S_1 = .10$ | | |
| II | $R_3 = -24.210$ | $t_2 = 1.60$ | | 1.620 | 60.3 |
| | $R_4 = -5.445$ | | $S_2 = .10$ | | |
| III | $R_5 = \infty$ | $t_3 = 1.80$ | | 1.611 | 58.8 |
| | $R_6 = -10.186$ | | $S_3 = .10$ | | |
| IV {a | $R_7 = \infty$ | $t_4 = 1.40$ | | 1.620 | 60.3 |
| | $R_8 = -7.0469$ | | | | |
| b | $R_9 = -7.0469$ | $t_5 = .70$ | | 1.751 | 27.8 |
| | $R_{10} = -7.0469$ | | $S_4 = .06$ | | |
| c | $R_{11} = 7.4473$ | $t_6 = 1.80$ | | 1.517 | 64.5 |
| | $R_{12} = 100.00$ | | $S_5 = .44$ | | |
| V | $R_{13} = -22.909$ | $t_7 = 3.60$ | | 1.617 | 54.9 |
| | $R_{14} = -13.183$ | | $S_6 = 4.70$ | | |
| VI | $R_{15} = -36.983$ | $t_8 = 3.90$ | | 1.720 | 36.2 |
| | $R_{16} = -18.030$ | | $S_7 = 9.00$ | | |
| VII | $R_{17} = 7.5858$ | $t_9 = 3.67$ | | 1.617 | 54.9 |
| | $R_{18} = 5.5463$ | | | | | and wherein E.F. represents the equivalent focus and N.A. represents the numerical aperture of said system. The working distance W.D. in this example is .44 unit of the kind used in the table above.

Although only a single specific form of this invention has been shown and described in detail, various changes may be made in the constructional data therefor and substitutions may be made therein without departing from the spirit or scope of the appended claims.

I claim:

1. An optical system for a microscope objective which produces a flat field and has diffraction limited performance over the entire image field, a magnification of 50X and a numerical aperture of 0.85, said system comprising a plurality of optically aligned lens members which are numbered from front to rear hereafter and include, first, second, fifth and sixth lens members of positive focal length and meniscus form, all of which are air spaced from their adjacent lens members and are concave toward the object, a collective third lens member spaced rearwardly of said second member, a triplet fourth lens member of negative focal length and spaced rearwardly from said third lens, said fourth member including a negative lens element interposed between two positive lens elements, one of the positive elements being in contact with said negative element and the other positive element being axially spaced therefrom, and a seventh lens member of negative focal length and meniscus form which is concave toward the image and is air spaced rearwardly from said sixth member, said members having individual focal lengths $F_I$ to $F_{VII}$, the values of which are given substantially in the table herebelow wherein F designates the equivalent focus of said system, $F_I = 6.08F$     $F_V = 10.5F$
$F_{II} = 2.62F$     $F_{VI} = 10.7F$
$F_{III} = 3.97F$     $F_{VII} = -25.4F$
$F_{IV} = -3.91F$ the axial thicknesses $t_1$ to $t_9$ of said members and the air spaces $S_1$ to $S_7$ therebetween having values as given in the table herebelow, $$.73F<t_1<.88F$$
$$.34F<t_2<.42F$$
$$.38F<t_3<.47F$$
$$.85F<(t_4+t_5+t_6+S_4)<1.05F$$
$$.77F<t_7<.94F$$
$$.85F<t_8<1.03F$$
$$.77F<t_9<.94F$$
$$.0235F<S_1<.0287F$$
$$.0235F<S_2<.0287F$$
$$.0235F<S_3<.0287F$$
$$.086F<S_5<.105F$$
$$1.00F<S_6<1.23F$$
$$1.93F<S_7<2.35F$$

the refractive index $n_D$ and Abbe number $\nu$ of the successive lens members having relative values as given herebelow, $$1.617<n_D(I)<1.622$$
$$1.617<n_D(II)<1.622$$
$$1.608<n_D(III)<1.613$$
$$1.615<n_D(V)<1.620$$
$$1.718<n_D(VI)<1.722$$
$$1.615<n_D(VII)<1.620$$
$$54.0<\nu(I)<65.0$$
$$54.0<\nu(II)<65.0$$
$$53.0<\nu(III)<62.0$$
$$53.0<\nu(V)<61.0$$
$$34.0<\nu(VI)<38.0$$
$$53.0<\nu(VII)<61.0$$

the $n_D$ values of the two outer lens elements of the triplet lens member differing from the $n_D$ value of the interposed lens element by at least .130 and the corresponding $\nu$ values differing by at least 32.0.

2. An optical system for a microscope as set forth in claim 1,
the focal length of each of the three lens elements in said triplet member having values substantially as follows naming in order from the front side, Front element $FIVa=2.71F$
Center element $-FIVb=1.095F$
Rear element $FIVc=3.69F$ and the center element having symmetrical and equal radii of its lens surfaces.

3. An optical system for a microscope objective which produces a flat field and has diffraction limited performance over the entire image field, a magnification of 50X and a numerical aperture of 0.85, said system comprising a plurality of lens members in optical alignment consisting of
first, second, fifth and sixth lens members which have positive focal length and meniscus form, a singlet collective third lens member spaced rearwardly of the second member, a triplet fourth lens member of negative focal length and comprising a negative element (b), interposed between two positive elements (a) and (c), element (a) being in contact with element (b) and element (c) being axially spaced from element (b), and a seventh lens member having negative focal length and meniscus form which is concave toward the image, said members having radii of curvature of the successive lens surfaces which are designated $R_1$ to $R_{18}$ $$.43F<-R_1<.47F$$
$$.65F<-R_2<.71F$$
$$5.43F<-R_3<6.03F$$
$$1.23F<-R_4<1.34F$$
$$\pm R_5>10.0F$$
$$2.33F<-R_6<2.53F$$
$$\pm R_7>10.0F$$
$$1.59F<-R_8<1.75F$$
$$1.59F<-R_9<1.75F$$
$$1.59F<R_{10}<1.75F$$
$$1.69F<R_{11}<1.86F$$
$$22.8F<+R_{12}<24.8F$$
$$5.26F<-R_{13}<5.66F$$
$$3.0F<-R_{14}<3.3F$$
$$8.4F<-R_{15}<9.2F$$
$$4.11F<-R_{16}<4.51F$$
$$1.72F<R_{17}<1.90F$$
$$1.26F<R_{18}<1.38F$$
$$.73F<t_1<.88F$$
$$.34F<t_2<.42F$$
$$.38F<t_3<.47F$$
$$.30F<t_4<.37F$$
$$.15F<t_5<.18F$$
$$.38F<t_6<.47F$$
$$.77F<t_7<.94F$$
$$.85F<t_8<1.03F$$
$$.77F<t_9<.94F$$

the lens surfaces which are designated by the — sign being concave toward the object side of the system, the lens thicknesses being designated $t_1$ to $t_9$, $S_1$ to $S_7$ designating the axial space between the successive lens members, $n_D$ and $\nu$ represent respectively the refractive index and the Abbe number thereof, $$.0235F<S_1<.0287F$$
$$.0235F<S_2<.0287F$$
$$.0235F<S_3<.0287F$$
$$.0129F<S_4<.0157F$$
$$.086F<S_5<.105F$$
$$1.00F<S_6<1.23F$$
$$1.93F<S_7<2.35F$$
$$1.617<n_D(I)=n(II)<1.622$$
$$1.608<n_D(III)<1.613$$
$$1.617<n_D(IVa)<1.622$$
$$1.745<n_D(IVb)<1.755$$
$$1.512<n_D(IVc)<1.522$$
$$1.615<n_D(V)=n_D(VII)<1.620$$
$$1.715<n_D(VI)<1.725$$
$$54.0<\nu(I)=\nu(II)<65.0$$
$$53.0<\nu(III)<62.0$$
$$55.0<\nu(IVa)<65.0$$
$$25.0<\nu(IVb)<30.0$$
$$62.0<\nu(IVc)<66.0$$
$$52.0<\nu(V)=\nu(VII)<61.0$$
$$34.0<\nu(VI)<38.0$$

4. An optical system for a microscope objective which produces a flat field and has diffraction limited performance over the entire image field, a magnification of 50X and a numerical aperture of 0.85, said system comprising a plurality of optically aligned lens members which are numbered from front to rear hereafter and include,
first, second, fifth and sixth positive meniscus lens members, all of which are air spaced from their adjacent lens members and are concave toward the object,
a collective singlet third lens member spaced rearwardly of said second member,
a triplet fourth lens member of negative focal length air spaced rearwardly from said third lens and comprising a negative element (b), interposed between two positive elements (a) and (c), element (a) being in contact with element (b) and element (c) being axially spaced from element (b), and
a seventh lens member of negative focal length and meniscus form which is concave toward the image and is air spaced rearwardly from said sixth member,
said members having constructional data which are given substantially in the table herebelow wherein F designates the equivalent focus of said system, $R_1$ to $R_{18}$ denote the radii of the lens surfaces, the minus (—) sign used with certain R values denoting lens surfaces which are concave toward the object side, $t_1$ to $t_9$ denote the lens thicknesses, $S_1$ to $S_7$ designate the axial air spaces between the lens parts, and $n_D$ and $\mu$ represent the refractive index and Abbe number respectively of the glasses used in said lens parts,

| | |
|---|---|
| $R_1 = -.455F$ | $t_1 = .808F$ |
| $R_2 = -.686F$ | $t_2 = .381F$ |
| $R_3 = -5.76F$ | $t_3 = .429F$ |
| $R_4 = -1.3F$ | $t_4 = .334F$ |
| $R_5 = \infty$ | $t_5 = .167F$ |
| $R_6 = -2.43F$ | $t_6 = .429F$ |
| $R_7 = \infty$ | $t_7 = .86F$ |
| $R_8 = -1.68F$ | $t_8 = .93F$ |
| $R_9 = -1.68F$ | $t_9 = .825F$ |
| $R_{10} = 1.68F$ | $S_1 = .0239F$ |
| $R_{11} = 1.77F$ | $S_2 = .0239F$ |
| $R_{12} = 23.85F$ | $S_3 = .0239F$ |
| $R_{13} = -5.47F$ | $S_4 = .0143F$ |
| $R_{14} = -3.14F$ | $S_5 = .1048F$ |
| $R_{15} = -8.85F$ | $S_6 = 1.12F$ |
| $R_{16} = -4.29F$ | $S_7 = 2.14F$ |
| $R_{17} = 1.81F$ | |
| $R_{18} = 1.32F$ | |

$n_D(I) = n_D(II) = n_D(IVa) = 1.620$ and $\nu = 60.3$
$n_D(III) = 1.611$ and $\nu = 58.8$
$n_D(IVb) = 1.751$ and $\nu = 27.8$
$n_D(IVc) = 1.517$ and $\nu = 64.5$
$n_D(V) = n_D(VII) = 1.617$ and $\nu = 54.9$
$n_D(VI) = 1.720$ and $\nu = 36.2$ 5. An optical system for a microscope objective having a working distance of at least 10% of its focal length, a magnification of 50× and a numerical aperture of 0.85, said system having diffraction limited performance and a flat field, said system being composed of nine optically aligned lens elements I, II, III, IVa, IVb, IVc, V, VI and VII which are air spaced from each other, except elements IVa and IVb which lie in contact with each other, and having constructional data as set forth in the table of numerical values herebelow wherein $R_1$ to $R_{18}$ designate the radii of the lens curvatures, the radii values having the minus ($-$) sign being concave toward the object side, $t_1$ to $t_9$ denote the axial thicknesses of the successive lenses, $S_1$ to $S_7$ represent the air spaces between said lenses, and $n_D$ and $\nu$ represent respectively the refractive index and the Abbe number of the glass from which the lenses I to VII are made,

[E.F. = 4.19. Magnification = 50×. N.A. = 0.85]

| Lens | Radii | Thickness | Spaces | $n_D$ | $\nu$ |
|---|---|---|---|---|---|
| I | $R_1 = -1.9055$ | $t_1 = 3.39$ | | 1.620 | 60.3 |
| | $R_2 = -2.8576$ | | $S_1 = .10$ | | |
| II | $R_3 = -24.210$ | $t_2 = 1.60$ | | 1.620 | 60.3 |
| | $R_4 = -5.445$ | | $S_2 = .10$ | | |
| III | $R_5 = \infty$ | $t_3 = 1.80$ | | 1.611 | 58.8 |
| | $R_6 = -10.186$ | | $S_3 = .10$ | | |
| IV a | $R_7 = \infty$ | $t_4 = 1.40$ | | 1.620 | 60.3 |
| | $R_8 = -7.0469$ | | | | |
| IV b | $R_9 = -7.0469$ | $t_5 = .70$ | | 1.751 | 27.8 |
| | $R_{10} = -7.0469$ | | $S_4 = .06$ | | |
| IV c | $R_{11} = 7.4473$ | $t_6 = 1.80$ | | 1.517 | 64.5 |
| | $R_{12} = 100.00$ | | $S_5 = .44$ | | |
| V | $R_{13} = -22.909$ | $t_7 = 3.60$ | | 1.617 | 54.9 |
| | $R_{14} = -13.183$ | | $S_6 = 4.70$ | | |
| VI | $R_{15} = -36.983$ | $t_8 = 3.90$ | | 1.720 | 36.2 |
| | $R_{16} = -18.030$ | | $S_7 = 9.00$ | | |
| VII | $R_{17} = 7.5858$ | $t_9 = 3.07$ | | 1.617 | 54.9 |
| | $R_{18} = 5.5463$ | | | | | wherein E.F. represents the equivalent focus and N.A. represents the numerical aperture of said system.

No references cited.

UNITED STATES PATENT OFFICE
CERTIFICATE OF CORRECTION

Patent No. 3,138,651            June 23, 1964

Paul L. Ruben

It is hereby certified that error appears in the above numbered patent requiring correction and that the said Letters Patent should read as corrected below.

Column 3, line 22, for "1.167" read -- 1.617 --; column 5, line 71, for "1.34F" read -- 1.35F --.

Signed and sealed this 10th day of November 1964.

(SEAL)
Attest:

ERNEST W. SWIDER
Attesting Officer

EDWARD J. BRENNER
Commissioner of Patents